(12) United States Patent
Parkin et al.

(10) Patent No.: US 8,105,042 B2
(45) Date of Patent: Jan. 31, 2012

(54) INTERMEDIATE-MANUFACTURED COMPOSITE AIRFOIL AND METHODS FOR MANUFACTURING

(75) Inventors: Michael Parkin, S. Glastonbury, CT (US); Phillip Alexander, Colchester, CT (US); Carl Brian Klinetob, East Haddam, CT (US); Steven Clarkson, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 417 days.

(21) Appl. No.: 12/418,760

(22) Filed: Apr. 6, 2009

(65) Prior Publication Data

US 2010/0254821 A1    Oct. 7, 2010

(51) Int. Cl.
*F01D 5/18* (2006.01)

(52) U.S. Cl. ............... 416/223 R; 416/226; 416/229 R; 416/230

(58) Field of Classification Search .............. 416/223 R, 416/226, 229 R, 230
See application file for complete search history.

(56) References Cited

U.S. PATENT DOCUMENTS

| | | | |
|---|---|---|---|
| 4,393,353 A | 7/1983 | Minagawa | |
| 4,741,873 A | 5/1988 | Fischer et al. | |
| 4,916,997 A | 4/1990 | Spain | |
| 4,988,469 A | 1/1991 | Reavely et al. | |
| 5,016,516 A | 5/1991 | Aldrich et al. | |
| 5,096,384 A * | 3/1992 | Immell et al. | 416/229 R |
| 5,279,892 A | 1/1994 | Baldwin et al. | |
| 5,393,215 A | 2/1995 | Donovan, Sr. | |
| 5,516,271 A | 5/1996 | Swenor et al. | |
| 6,197,146 B1 * | 3/2001 | Sucic et al. | 156/245 |
| 6,234,423 B1 * | 5/2001 | Hirahara et al. | 244/123.7 |
| 2001/0017336 A1 * | 8/2001 | Hirahara et al. | 244/123 |
| 2003/0129061 A1 | 7/2003 | Finn et al. | |
| 2003/0218267 A1 | 11/2003 | Husmann et al. | |
| 2007/0092379 A1 | 4/2007 | Coupe | |
| 2010/0062238 A1 * | 3/2010 | Doyle et al. | 428/295.1 |

FOREIGN PATENT DOCUMENTS

| | | |
|---|---|---|
| EP | 0541718 | 2/2009 |
| GB | 871625 | 6/1961 |
| GB | 2262315 | 6/1993 |

OTHER PUBLICATIONS

EP Search Report dated May 5, 2011.
Karlsson, K.F., et al., Manufacturing and applications of structural sandwich components, Composites, IPC Business Press Ltd. Haywards Heath, GB, vol. 28, No. 2, Jan. 1, 1997, Stockholm, Sweden.

* cited by examiner

*Primary Examiner* — Michael Lebentritt
(74) *Attorney, Agent, or Firm* — Carlson Gaskey & Olds, P.C.

(57) ABSTRACT

An intermediate-manufactured composite airfoil includes first and second composite skins each having a plurality of fibers in a polymer matrix. A composite core is removably located between the first and second composite skins. The composite core includes a dry, three-dimensional, woven fiber network. The composite core may alternatively include a three-dimensional, woven fiber network in a fully cured polymer matrix.

11 Claims, 2 Drawing Sheets

INTERMEDIATE-MANUFACTURED COMPOSITE AIRFOIL AND METHODS FOR MANUFACTURING

BACKGROUND OF THE INVENTION

This disclosure relates to composite airfoils, such as blades for gas turbine engines.

Gas turbine engine fan blades have typically been formed from strong and durable metal alloys, such as titanium alloy, to achieve a desired degree of strength and durability under the operating conditions of the engine. More recently, there has been interest in composite blades to reduce weight, for example. A composite blade may include a composite core sandwiched between composite skins. The composite core may include a three-dimensional network of reinforcing fibers in a polymer matrix, and the composite skins typically include unidirectionally oriented fibers in polymer matrices. The composite core provides delamination resistance and the composite skins provide strength and resistance to deformation under the known stresses on the blade during operation of the engine.

One method for fabricating a composite blade includes forming a preform of the composite core that includes the network of fibers in an uncured matrix. The composite skins may be formed from prepreg fiber layers that are arranged on the preform core. The perform core and the prepreg fiber layers are then co-cured to form the blade.

SUMMARY OF THE INVENTION

An exemplary intermediate-manufactured composite airfoil includes first and second composite skins each having a plurality of fibers in a polymer matrix. A composite core is removably located between the first and second composite skins. The composite core may include a dry, three-dimensional, woven fiber network.

In another aspect, an exemplary intermediate-manufactured composite airfoil includes first and second composite skins each having a plurality of fibers in a polymer matrix. A composite core is removably located between the first and second composite skins. The composite core may include a three-dimensional, woven fiber network in a fully cured polymer matrix.

An exemplary method for manufacturing a composite airfoil includes arranging a composite core removably between first and second composite skins in a mold. The first and second composite skins each include a plurality of fibers in a polymer matrix, and the composite core includes a dry, three-dimensional, woven fiber network. Resin is transferred into the woven fiber network. The resin is then cured to join the composite core and the first and second composite skins together.

Another exemplary method for manufacturing a composite airfoil includes arranging a composite core removably between first and second composite skins. The first and second composite skins each include a plurality of fibers in a polymer matrix, and the composite core includes a three-dimensional, woven fiber network in a fully cured polymer matrix. The composite core and the first and second composite skins are then joined together.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1A:
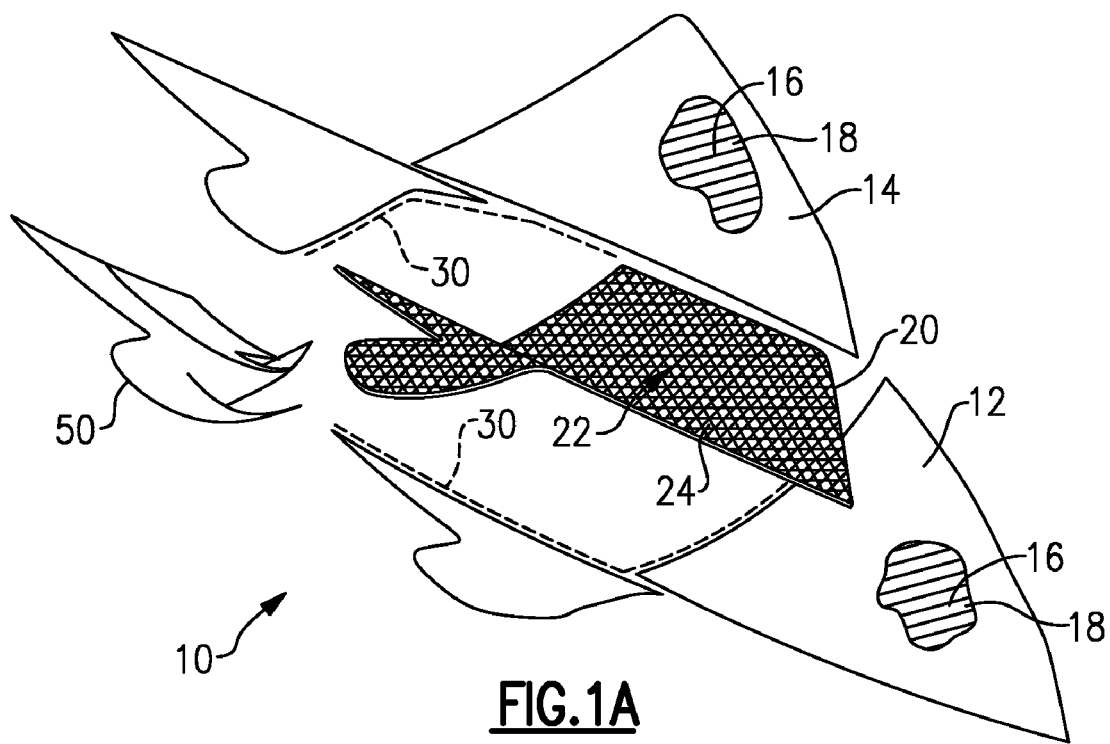
FIG. 1A illustrates an example intermediate-manufactured composite airfoil.

FIG. 1A illustrates an exploded view of an intermediate-manufactured composite airfoil 10 (hereafter "the composite airfoil 10") for use in a gas turbine engine fan, for example. It is to be understood that the example composite airfoil 10, in final form, is not limited to use in a gas turbine engine and that other devices may benefit from the examples of this disclosure.

The composite airfoil 10 includes first and second composite skins 12 and 14 that each has a plurality of fibers 16 (illustrated in cutaway) within a polymer matrix 18. In this case, the fibers 16 are unidirectionally oriented to achieve a desired degree of strength and resistance to deformation. Although the first and second composite skins 12 and 14 are shown as separate and distinct pieces, the first and second skins 12 and 14 may alternatively include additional pieces or be a single piece that wraps around an interior area.

A composite core 20 is removably located between the first and second composite skins 12 and 14. In this example, the composite core 20 includes a dry, three-dimensional, woven fiber network 22. The term "dry" refers to the woven fiber network 22 being free of any polymer material between the fibers. Alternatively, the composite core 20 may include the woven fiber network 22 in a fully cured polymer matrix 24. For instance, the composite core 20 may be a polymer-impregnated, three-dimensional, fiber preform. The composite airfoil 10 may include 50-75 wt % of the fibers 16 and 22 relative to the combined weight of the fibers 16 and 22 and polymer matrices 18 and 24.

The first and second composite skins 12 and 14 may be stacked in a mold with the composite core 20 there between to form the intermediate-manufactured composite airfoil 10. In this regard, the composite core 20 is not yet attached to the first and second composite skins 12 and 14 and is removable up until a subsequent joining process. Thus, the term "intermediate-manufactured" refers to the composite airfoil 10 in an incomplete state prior to permanently attaching the composite core 20 to the first and second composite skins 12 and 14.

The polymer matrices 18 of the first and second composite skins 12 and 14 may be uncured or fully cured in the intermediate-manufactured composite airfoil 10, depending upon a selected fabrication process. For instance, the first and second composite skins 12 and 14 may be completely separately formed from the composite core 20 and provided in a fully cured state for arrangement with the composite core 20. Alternatively, the first and second composite skins 12 and 14 may be provided in an uncured or partially cured state for arrangement with the composite core 20. In this case, the curing of the polymer matrices 18 may occur in conjunction with joining the composite core 20 and the first and second composite skins 12 and 14 together, as will be described below.

The composite core 20 may be separately formed from the first and second composite skins 12 and 14. For instance, the woven fiber network 22 may be prepared in a known manner by weaving the fibers in a loom. If the composite core 20 includes the fully cured polymer matrix 24, the fibers may be impregnated with a polymer using known resin transfer molding techniques or other impregnation methods, for example, to form the matrix 24.

In the above examples, the fibers 16 of the first and second composite skins 12 and 14 and the fibers of the woven fiber network 22 may include high strength fibers, such as carbon fibers. The polymer matrix 18 and the polymer matrix 24 of the composite core 20 (if used) may include a relatively strong and durable material, such as epoxy. It is to be understood however, that the fibers and polymer are not limited to the given examples. Given this description, one of ordinary skill in the art will recognize other types of fibers and polymers to meet their particular needs.

Optionally, the composite airfoil 10 may also include adhesive layers 30 (shown schematically) between the composite core 20 and each of the first and second composite skins 12 and 14. For instance, the adhesive layers 30 may include epoxy and may be used to join the composite core 20 and the first and second skins 12 and 14 together. Alternatively, the adhesive layers 30 may include a different type of polymer or another type of polymer in addition to epoxy to facilitate bonding between the composite core 20 and the first and second composite skins 12 and 14.

The composite airfoil 10 may also include a metal sheath 50 that is bonded to at least one of the first and second composite skins 12 and 14. For example, the metal sheath 50 may be bonded to a leading edge of the composite airfoil 10 to protect the leading edge from erosion and impact from particles in the air moving over the blade. For example, the metal sheath 50 may be formed from a titanium alloy and bonded to the composite airfoil 10 in a known manner.

Figure 1B:
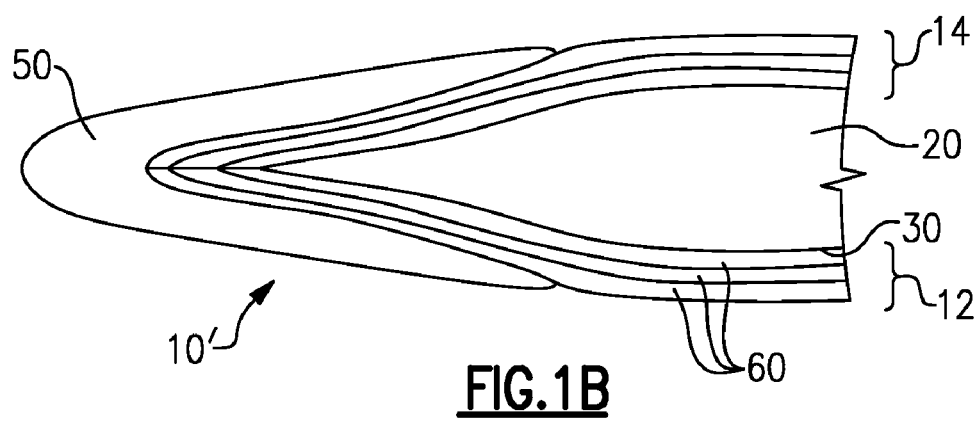
FIG. 1B illustrates a final-formed composite airfoil.

FIG. 1B illustrates a portion of a final-formed composite airfoil 10' after joining of the composite core 20 and the first and second composite skins 12 and 14. In this example, each of the first and second composite skins 12 and 14 includes layers 60 each having the fibers 16 (not shown) in the unidirectional orientation.

Figure 2:
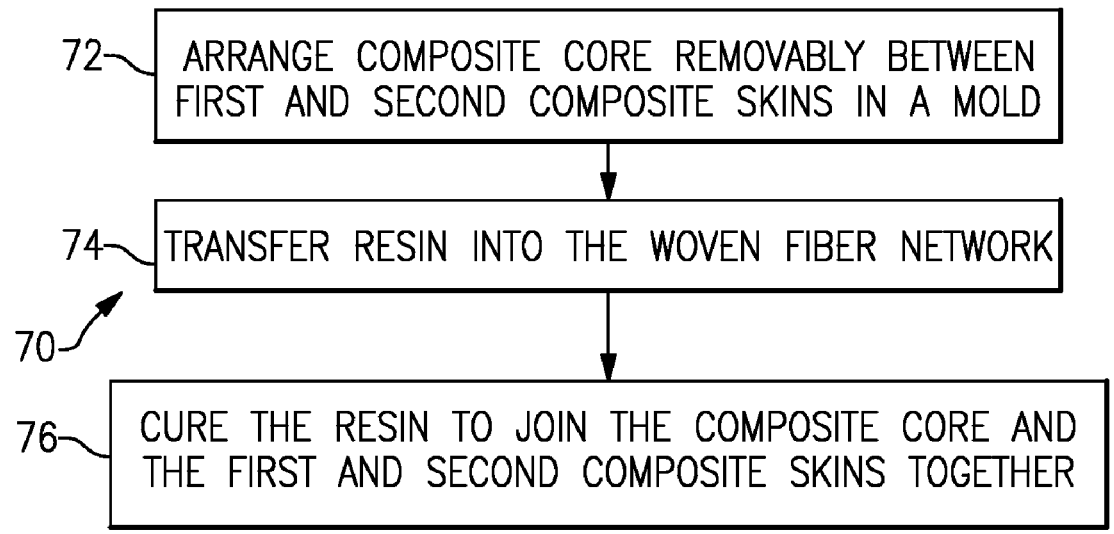
FIG. 2 illustrates an example method for forming a composite airfoil.

FIG. 2 illustrates an example method 70 for manufacturing the composite airfoil 10' from the intermediate-manufactured composite airfoil 10 of the prior examples. In this example, the method 70 includes an arrangement step 72, a molding step 74, and a curing step 76. The arrangement step 72 may include arranging the composite core 20 removably between the first and second composite skins 12 and 14 in a mold. In this example, it is assumed that the woven fiber network 22 of the composite core 20 is dry (no polymer matrix 24). In the molding step 74, a resin (polymer) is transferred into the woven fiber network 22 in a known manner. For instance, transferring the resin may include establishing a vacuum at a lower pressure than ambient pressure to assist in moving the resin between the fibers.

The resin may then be cured during the curing step 76. For instance, the mold be heated and maintained for a predefined amount of time at a predefined temperature for curing. The temperature may correspond to the type of polymer used to fill the woven fiber network 22. For instance, if epoxy is used, the temperature may be between about 160-200° C. The temperature may be varied from the given example range however, if the adhesive 30 is used, to also cure the adhesive 30. In this example, if the polymer matrix 18 of the first and second composite skins 12 and 14 is not fully cured, the heat from the mold also fully cures the polymer matrix 18. Likewise, if the adhesive layers 30 are used, the heat fully cures the adhesive layers 30.

Figure 3:
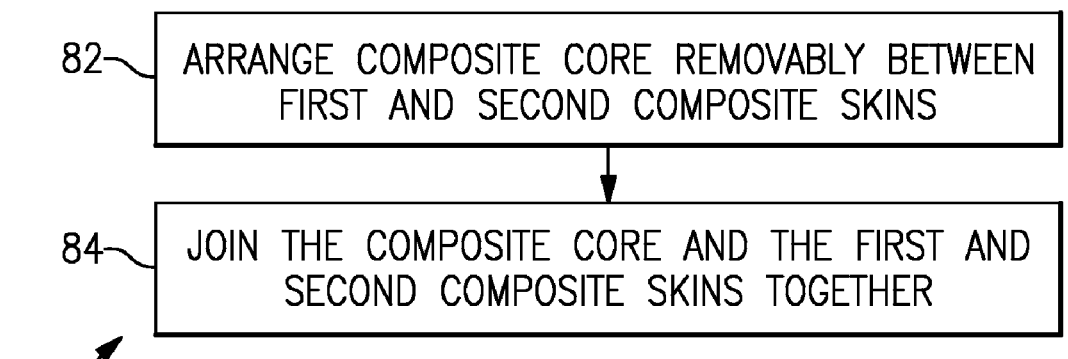
FIG. 3 illustrates another example method of forming a composite airfoil.

FIG. 3 illustrates another example method 80 for forming the composite airfoil 10' from the intermediate-manufactured composite airfoil 10 of the prior examples. The method 80 includes an arrangement step 82 and a joining step 84. The arrangement step 82 includes placing the composite core 20 removably between the first and second composite skins 12 and 14. In this example, it is assumed that the composite core 20 includes the woven fiber network 22 in the fully cured polymer matrix 24. The first and second composite skins 12 and 14 may be fully cured or uncured. If uncured, the layers 60 may be laid-up into the mold and on to the composite core 20 to form the respective first and second composite skins 12 and 14. If cured, the first and second composite skins 12 and 14 may simply be paced into the mold and on the composite core 20 in the mold.

The composite core 20 and the first and second composite skins 12 and 14 are then joined together at the joining step 84. The process parameters selected for the joining may depend to some degree upon the state of the first and second composite skins 12 and 14. The first and second composite skins 12 and 14 may be fully cured or uncured. The joining step 84 may include heating the composite airfoil 10 and using the adhesive layers 30 to join the first and second composite skins 12 and 14 and the composite core 20 together. The heat cures the adhesive layers 30 and, if the first and second composite skins 12 and 14 are uncured, also cures the skins. The metal sheath 50 may then be bonded to one or both of the first and second composite skins 12 and 14 in a known manner.

In the example methods 70 and 80, the first and second composite skins 12 and 14 may be substantially completely formed and cured prior to arrangement with the composite core 20. Forming the first and second composite skins 12 and 14 separately from the composite core 20 provides the benefits of being able to inspect the first and second composite skins 12 and 14 according to established quality standards prior to joining with the composite core 20. For instance, if there is a surface defect on a skin that could affect joining with the composite core 20, that skin may be discarded. Additionally, forming the first and second composite skins 12 and 14 separately from the composite core 20 may permit automated fabrication using known unidirectional fiber tape placement techniques that are not available with prior methods, and autoclave curing of the skins 12 and 14. Also, the forming process selected for the first and second composite skins 12 and 14 is not limited by the forming process selected for the composite core 20. Thus, the fabrication processes for the first and second composite skins 12 and 14 and the composite core 20 may be optimized to lower cost, simplify design, or incorporate design details that might not otherwise be available using prior co-molding methods.

As may be appreciated, the disclosed methods 70 and 80 provide advantages that are not realized with prior methods. For instance, the methods 70 and 80 provide flexibility in selection of the materials and processes used to form the composite airfoil 10'. For instance, it is not necessary to form and/or cure the polymers of the composite core 20 and the first and second composite skins 12 and 14 together and thus, there is flexibility to choose different polymers for these components. Likewise, the methods 70 and 80 are not limited to forming the composite core 20 and the first and second composite skins 12 and 14 in the same process and thus, different techniques may be used to individually form the composite core 20 and the first and second composite skins 12 and 14. Therefore, the methods 70 and 80 provide process and material selection flexibility.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for manufacturing a composite airfoil, comprising:
   arranging a composite core removably between first and second composite skins in a mold, the first and second composite skins each including a plurality of fibers in a polymer matrix, and the composite core including a dry, three-dimensional, woven fiber network;
   transferring resin into the woven fiber network; and
   curing the resin to join the composite core and the first and second composite skins together.

2. The method as recited in claim 1, further comprising laying-up polymer-impregnated fiber layers in the mold to form the first and second composite skins.

3. The method as recited in claim 1, wherein the transferring of the resin into the woven fiber network includes transferring under a vacuum relative to ambient pressure.

4. The method as recited in claim 1, wherein the curing of the resin is conducted at a temperature of about 160-200° C.

5. The method as recited in claim 1, further comprising joining a metal sheath to at least one of the first and second composite skins.

6. The method as recited in claim 1, further comprising autoclave curing the first and second composite skins prior to arrangement with the composite core.

7. A method for manufacturing a composite airfoil, comprising:
   arranging a composite core removably between first and second composite skins, the first and second composite skins each including a plurality of fibers in a polymer matrix, and the composite core including a three-dimensional, woven fiber network in a fully cured polymer matrix; and
   joining the composite core and the first and second composite skins together.

8. The method as recited in claim 7, further comprising fully curing the polymer matrices of the first and second composite skins prior to arranging the composite core between the first and second composite skins and, in a separate action, fully curing the polymer matrix of the composite core.

9. The method as recited in claim 8, further comprising arranging an adhesive layer between the composite core and each of the first and second composite skins after fully curing the polymer matrices of the first and second composite skins and the polymer matrix of the composite core.

10. The method as recited in claim 7, further comprising joining a metal sheath to at least one of the first and second composite skins.

11. The method as recited in claim 7, further comprising autoclave curing the first and second composite skins prior to arrangement with the composite core.

* * * * *